US012757203B2

(12) United States Patent
Goto et al.

(10) Patent No.: US 12,757,203 B2
(45) Date of Patent: Oct. 6, 2026

(54) WIRELESS COMMUNICATION SYSTEM, COMMUNICATION APPARATUS, COMMUNICATION CONTROL APPARATUS, WIRELESS COMMUNICATION METHOD AND COMMUNICATION CONTROL METHOD

(71) Applicant: NTT, Inc., Tokyo (JP)

(72) Inventors: Daisuke Goto, Musashino (JP); Fumihiro Yamashita, Musashino (JP); Kiyohiko Itokawa, Musashino (JP); Yasuyoshi Kojima, Musashino (JP); Tomoya Kageyama, Musashino (JP); Kazumitsu Sakamoto, Musashino (JP); Takeshi Onizawa, Tokyo (JP)

(73) Assignee: NTT, Inc., Tokyo (JP)

( * ) Notice: Subject to any disclaimer, the term of this patent is extended or adjusted under 35 U.S.C. 154(b) by 250 days.

(21) Appl. No.: 18/729,462

(22) PCT Filed: Jan. 19, 2022

(86) PCT No.: PCT/JP2022/001770

§ 371 (c)(1),
(2) Date: Jul. 16, 2024

(87) PCT Pub. No.: WO2023/139683

PCT Pub. Date: Jul. 27, 2023

(65) Prior Publication Data

US 2025/0097944 A1 Mar. 20, 2025

(51) Int. Cl.
*H04W 72/20* (2023.01)
*H04W 64/00* (2009.01)
*H04W 84/06* (2009.01)

(52) U.S. Cl.
CPC ......... *H04W 72/20* (2023.01); *H04W 64/006* (2013.01); *H04W 84/06* (2013.01)

(58) Field of Classification Search
None
See application file for complete search history.

(56) References Cited

U.S. PATENT DOCUMENTS

2012/0127883 A1* 5/2012 Chang .................. H04L 47/283 370/252
2015/0365997 A1* 12/2015 Jeong ................ H04W 52/0251 370/311
(Continued)

OTHER PUBLICATIONS

Kominami Daichi et al, "Self-organized transmission scheduling for LPWA networks considering gateway load balancing", The institute of electronics, information and communication engineers, Technical report of IEICE, vol. 117, No. 353, Dec. 2017.

*Primary Examiner* — Clemence S Han

(57) ABSTRACT

A wireless communication system includes a transmission apparatus and a communication apparatus that moves. Further, the wireless communication system includes a statistics calculation unit, an information generation unit, and a notification unit. The statistics calculation unit acquires a transmission condition used for a first radio signal transmitted from the transmission apparatus in an area and normally received by a reception unit of the communication apparatus, and generates statistical information of the acquired transmission condition. The information generation unit extracts a transmission condition having a high probability that a radio signal is normally received on the basis of the statistical information, and generates transmission control information indicating the extracted transmission condition. The notification unit notifies the transmission apparatus in the area of the transmission control information. A transmission control unit of the transmission apparatus determines a transmission condition of the radio signal on the basis of the transmission control information, and transmits a second radio signal from a wireless transmission unit that
(Continued)

transmits a radio signal to the communication apparatus according to the determined transmission condition.

14 Claims, 10 Drawing Sheets

(56) References Cited

U.S. PATENT DOCUMENTS

| | | | | |
|---|---|---|---|---|
| 2019/0028231 | A1* | 1/2019 | Wang | H04L 1/009 |
| 2022/0330049 | A1* | 10/2022 | Tan | H04L 1/08 |

* cited by examiner

| RECEPTION TIME | TERMINAL ID | POSITION INFORMATION | TRANSMISSION CONDITION NOTIFICATION INFORMATION | | | | | | ENVIRONMENT INFORMATION | | ADDITIONAL ACQUISITION INFORMATION | SENSOR DATA |
|---|---|---|---|---|---|---|---|---|---|---|---|---|
| | | | TRANSMISSION TIME | CHANNEL | NUMBER OF CHANNELS | NUMBER OF TRANSMISSIONS OF SAME SIGNAL | TRANSMISSION NUMBER | TRANSMISSION INTERVAL | WEATHER | NOISE FLOOR | ELEVATION ANGLE | |
| XXX | XXX | XXX | XXX | Ch1, Ch2 | 2 | N | n | XXX | SUNNY | XXX | X | XXXXXX |
| : | : | : | : | : | : | : | : | : | : | : | : | : |

FIG. 3

| SECTION INFORMATION | |
|---|---|
| AREA | XX TO XX |
| TIME ZONE | XX TO XX |
| **MAP INFORMATION** | |
| ELEVATION ANGLE | NUMBER OF COMMUNICATION SUCCESSES |
| 10° TO 11° | X |
| 11° TO 12° | X |
| : | : |
| NUMBER OF TRANSMISSIONS OF SAME SIGNAL | NUMBER OF COMMUNICATION SUCCESSES |
| 1 | X |
| 2 | X |
| : | : |

FIG. 4

WIRELESS COMMUNICATION SYSTEM, COMMUNICATION APPARATUS, COMMUNICATION CONTROL APPARATUS, WIRELESS COMMUNICATION METHOD AND COMMUNICATION CONTROL METHOD

CROSS-REFERENCE TO RELATED APPLICATIONS

This application is a 371 U.S. National Phase of International Application No. PCT/JP2022/001770, filed on Jan. 19, 2022. The entire disclosures of the above applications are incorporated herein by reference.

TECHNICAL FIELD

The present invention relates to wireless communication system, communication apparatus, communication control apparatus, wireless communication method, and communication control method.

BACKGROUND ART

With the development of Internet of Things (IoT) technology, it has been studied to install IoT terminals including various sensors in various places. The IoT terminals may be installed in a place where it is difficult to install a base station, such as a buoy or a ship on the sea or a mountainous area. Therefore, it is considered that a communication apparatus mounted on a low earth orbit satellite receives data collected by IoT terminals installed in various places and relays the received data to a base station installed on the ground.

It is assumed that a large number of IoT terminals are installed on the ground. Conventionally, in order to avoid collision of multi-terminal accesses in a low power wide area (LPWA) method, autonomous distributed transmission control for controlling a communication timing of a terminal by using a phase oscillator model has been performed (see, for example, Non Patent Literature 1). As a result, it is possible to normally receive a radio signal from each of a large number of terminals.

CITATION LIST

Non Patent Literature

Non Patent Literature 1: Daichi Kominami, Ikkyu Aihara, Masayuki Murata, "Self-organized transmission scheduling for LPWA networks considering gateway load balancing", The Institute of Electronics, Information and Communication Engineers, IEICE Technical Report, vol. 117, no. 353, p. 127-132, December 2017

SUMMARY OF INVENTION

Technical Problem

Conventionally, a communication success rate, which is a rate at which a radio signal is normally received, has been improved by collision avoidance between IoT terminals. However, the condition under which the radio signal transmitted from the IoT terminal is normally received varies depending on the communication environment.

In view of the above circumstances, an object of the present invention is to provide wireless communication system, communication apparatus, communication control apparatus, wireless communication method and communication control method capable of improving a communication success rate of radio signals transmitted from terminals in different communication environments to a communication apparatus that moves.

Solution to Problem

An aspect of the present invention is a wireless communication system including a transmission apparatus and a communication apparatus that moves, in which the transmission apparatus includes a wireless transmission unit (hereinafter also referred to as "wireless transmitter") that transmits a radio signal to the communication apparatus, and a transmission control unit (hereinafter also referred to as "transmission controller") that determines a transmission condition of a radio signal and performs control to transmit a first radio signal from the wireless transmission unit according to the determined transmission condition, and the communication apparatus includes a reception unit (hereinafter also referred to as "receiver") that receives the first radio signal transmitted from the transmission apparatus, the wireless communication system including: a statistics calculation unit (hereinafter also referred to as "statistics calculator") that acquires a transmission condition used for the first radio signal transmitted from the transmission apparatus in an area and normally received by the reception unit, and generates statistical information of the acquired transmission condition; an information generation unit (hereinafter also referred to as "information generator") that extracts a transmission condition having a high probability that a radio signal is normally received on the basis of the statistical information and generates transmission control information indicating the extracted transmission condition; and a notification unit (hereinafter also referred to as "sender") that notifies the transmission apparatus in the area of the transmission control information generated by the information generation unit, in which the transmission control unit determines a transmission condition of a radio signal on the basis of the transmission control information, and performs control to transmit a second radio signal from the wireless transmission unit according to the determined transmission condition.

An aspect of the present invention is a communication apparatus including: a reception unit that receives a radio signal; a statistics calculation unit that acquires a transmission condition used for transmission of the radio signal transmitted from a transmission apparatus in an area and normally received by the reception unit, and generates statistical information of the acquired transmission condition; an information generation unit that extracts a transmission condition having a high probability that a radio signal is normally received on the basis of the statistical information and generates transmission control information indicating the extracted transmission condition; and a notification unit that notifies the transmission apparatus in the area of the transmission control information generated by the information generation unit.

An aspect of the present invention is a communication control apparatus including: a statistics calculation unit that acquires a transmission condition used for transmission of a radio signal transmitted from a transmission apparatus in an area and normally received by a communication apparatus, and generates statistical information of the acquired transmission condition; an information generation unit that extracts a transmission condition having a high probability that a radio signal is normally received on the basis of the statistical information and generates transmission control information indicating the extracted transmission condition; and a notification unit that notifies the transmission apparatus in the area of the transmission control information generated by the information generation unit.

An aspect of the present invention is a wireless communication method executed by a wireless communication system including a transmission apparatus and a communication apparatus that moves, the wireless communication method including: a wireless transmission step of transmitting a radio signal to the communication apparatus by a wireless transmission unit of the transmission apparatus; a transmission control step of determining a transmission condition of a radio signal and performing control to transmit a first radio signal from the wireless transmission unit according to the determined transmission condition by a transmission control unit of the transmission apparatus; a reception step of receiving the first radio signal transmitted from the transmission apparatus by a reception unit of the communication apparatus; a statistics calculation step of acquiring the transmission condition used for the first radio signal transmitted from the transmission apparatus in an area and normally received in the reception step, and generating statistical information of the acquired transmission condition by the wireless communication system; an information generation step of extracting a transmission condition having a high probability that a radio signal is normally received on the basis of the statistical information and generating transmission control information indicating the extracted transmission condition by the wireless communication system; a notification step of notifying the transmission apparatus in the area of the generated transmission control information by the wireless communication system; and a step of determining a transmission condition of a radio signal on the basis of the transmission control information, and performing control to transmit a second radio signal from the wireless transmission unit according to the determined transmission condition by the transmission control unit.

An aspect of the present invention is a wireless communication method including: a reception step of receiving a radio signal; a statistics calculation step of acquiring a transmission condition used for transmission of the radio signal transmitted from a transmission apparatus in an area and normally received in the reception step, and generating statistical information of the acquired transmission condition; an information generation step of extracting a transmission condition having a high probability that a radio signal is normally received on the basis of the statistical information and generating transmission control information indicating the extracted transmission condition; and a notification step of notifying the transmission apparatus in the area of the generated transmission control information.

An aspect of the present invention is a communication control method including: a statistics calculation step of acquiring a transmission condition used for transmission of a radio signal transmitted from a transmission apparatus in an area and normally received by a communication apparatus, and generating statistical information of the acquired transmission condition; an information generation step of extracting a transmission condition having a high probability that a radio signal is normally received on the basis of the statistical information and generating transmission control information indicating the extracted transmission condition; and a notification step of notifying the transmission apparatus in the area of the generated transmission control information.

Advantageous Effects of Invention

According to the present invention, it is possible to improve a communication success rate of radio signals transmitted from terminals in different communication environments to a communication apparatus that moves.

BRIEF DESCRIPTION OF DRAWINGS

FIG. 3 is a diagram illustrating reception signal information according to the embodiment.

FIG. 4 is a diagram illustrating map information according to the embodiment.

DESCRIPTION OF EMBODIMENTS

Figure 1:
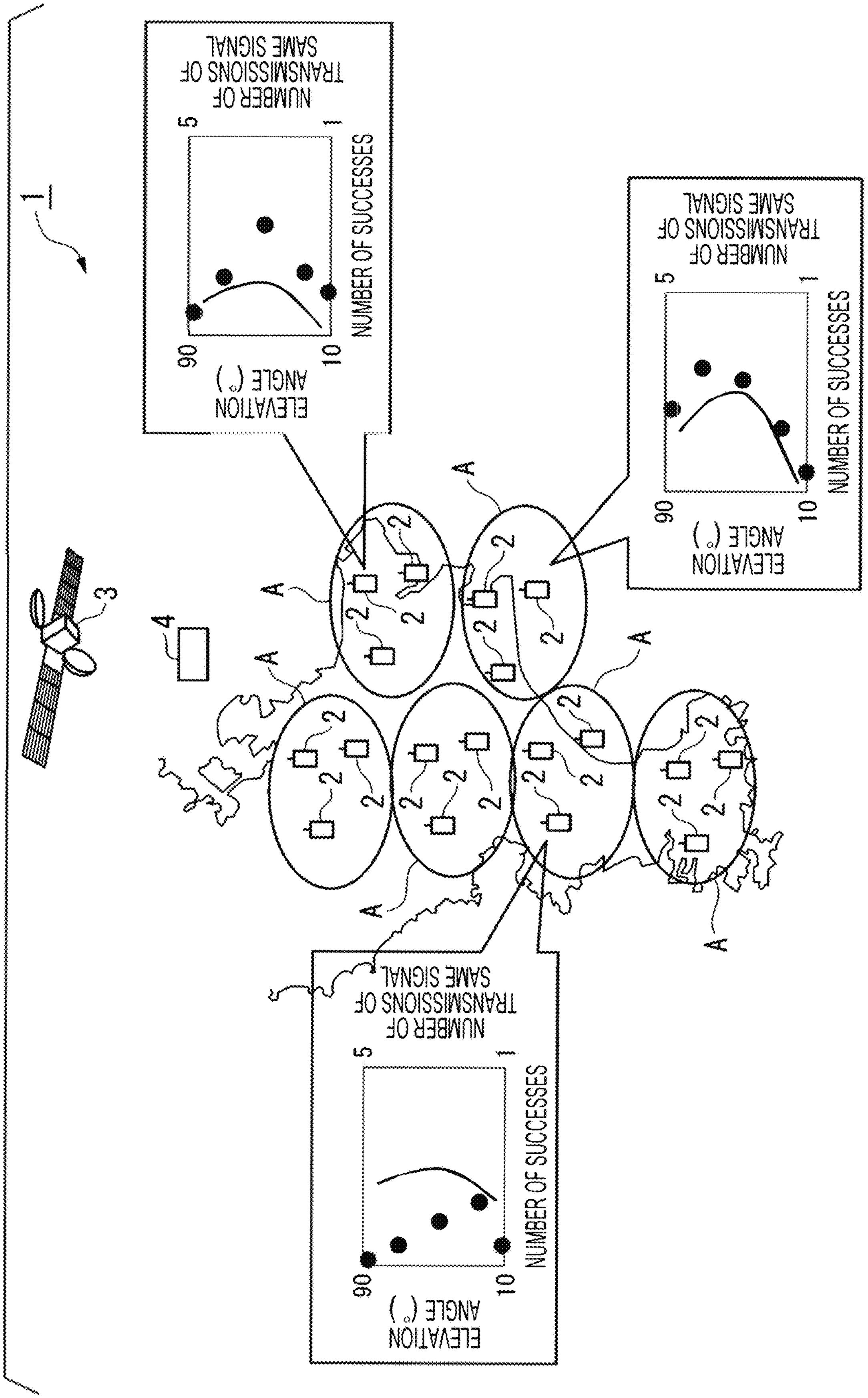
FIG. 1 is a diagram for describing a wireless communication system according to a first embodiment of the present invention.

Hereinafter, embodiments of the present invention will be described in detail with reference to the drawings. In each embodiment described below, the same components as those in another embodiment are denoted by the same reference numerals, and redundant description may be omitted.

First Embodiment

FIG. 1 is a diagram for describing an outline of a wireless communication system 1 according to a first embodiment of the present invention. The wireless communication system 1 includes a terminal station 2, a mobile relay station 3, and a base station 4. The numbers of terminal stations 2, mobile relay stations 3, and base stations 4 included in the wireless communication system 1 each are arbitrary, but it is assumed that there is a large number of terminal stations 2.

The mobile relay station 3 is an example of a communication apparatus that is mounted on a moving body and whose communicable area moves with the lapse of time. The mobile relay station 3 of the present embodiment is provided in a low earth orbit (LEO) satellite. The LEO satellite has an altitude of 2000 km or less and moves around the earth once every about 1.5 hours. The terminal station 2 and the base station 4 are installed on the earth such as on the ground or on the sea. The terminal station 2 is, for example, an IoT terminal. A radio signal from the terminal station 2 to the mobile relay station 3 will be referred to as a terminal uplink signal, a radio signal from the mobile relay station 3 to the terminal station 2 will be referred to as a terminal downlink signal. In addition, a radio signal from the mobile relay station 3 to the base station 4 will be referred to as a base station downlink signal, and a radio signal from the base station 4 to the mobile relay station 3 will be referred to as a base station uplink signal.

Since the mobile relay station 3 mounted on the LEO satellite performs communication while moving at a high speed, a time during which each terminal station 2 or the base station 4 can communicate with the mobile relay station 3 is limited. Specifically, when viewed on the ground, the mobile relay station 3 passes through the sky in about several minutes. An area A, which is the communication destination of the mobile relay station 3, changes as the mobile relay station 3 moves. The terminal station 2 collects and stores data such as sensor data detected by a sensor. The terminal station 2 transmits a terminal uplink signal in which the collected data is set at a timing at which communication with the mobile relay station 3 is possible. The mobile relay station 3 accumulates data received from each terminal station 2 via the terminal uplink signal and wirelessly transmits the accumulated data via a base station downlink signal at a timing at which communication with the base station 4 is possible. The base station 4 acquires the data collected by the terminal station 2 from the received base station downlink signal.

The mobile relay station 3 includes an antenna used for wireless communication with the terminal station 2 and an antenna used for wireless communication with the base station 4. Thus, the mobile relay station 3 can perform wireless communication with the terminal station 2 and wireless communication with the base station 4 in parallel.

As the mobile relay station, it is conceivable to use a relay station mounted on a geostationary satellite, or an unmanned aerial vehicle such as a drone or a high altitude platform station (HAPS). However, a relay station mounted on a geostationary satellite has a wide coverage area (footprint) on the ground, but has a very small link budget with respect to IoT terminals installed on the ground because its altitude is high. On the other hand, in the case of a relay station mounted on a drone or a HAPS, the link budget is high, but the coverage area is small. Furthermore, the drone requires a battery, and the HAPS requires a solar panel. In the present embodiment, the mobile relay station 3 is mounted on an LEO satellite. Thus, the link budget falls within a limit, and, in addition, the LEO satellite has no air resistance and has low fuel consumption because the LEO satellite moves around the outside of the atmosphere. In addition, the footprint is larger than that in the case of the relay station mounted on the drone or the HAPS.

On the other hand, a transmission success condition of the terminal uplink signal from the terminal station 2 to the mobile relay station 3 varies depending on the communication environment. The communication environment is, for example, the number of peripheral terminal stations 2, the number of terminals that cause interference, shielding objects such as buildings and mountains, and the like. The antenna elevation angle at which the communication success rate of the terminal uplink signal is high, the number of transmissions of the same signal, the signal transmission timing, and the like vary depending on the communication environment. For example, in a case where the antenna elevation angle of the terminal station 2 is oriented in the direction of a shielding object, the communication success rate decreases. In addition, for example, in enhanced machine type communication (eMTC)/narrow band internet of things (NB-IoT), which is a service for IoT of long term evolution (LTE), there is a Repetition function of extending coverage by repeatedly transmitting the same signal (see, for example, Reference Literature 1). In Sigfox, which is one of LPWA services, the same message is always transmitted from the terminal three times consecutively (see, for example, Reference Literature 2). When the number of transmissions of the same signal increases, the communication success rate temporarily improves, but when the number of transmissions of the same signal is too large, the communication success rate decreases due to occurrence of interference. Then, the communication success rate in the time zone with less interference is high, and the communication success rate in the time zone with more interference is low.

(Reference Literature 1) "LPWA ni kansuru musen system no doukou ni tsuite (in Japanese) (Trends in Wireless Systems Related to LPWA)", the Ministry of Internal Affairs and Communications, [online], 2018, the Internet <URL: https://www.soumu.go.jp/main_content/000543715.pdf>

(Reference Literature 2) "SIGFOX network no goshokai (in Japanese) (Introduction to SIGFOX networks)", the Ministry of Internal Affairs and Communications, working group material of Information and Communications Council, [online], 2016, the Internet <URL: https://www-.soumu.go.jp/main_content/000450876.pdf>

Therefore, the mobile relay station 3 creates a distribution of the number of communication successes or the communication success rate for the conditions under which the transmission from the terminal station 2 has succeeded, for each section based on the position information of the terminal station 2 and the signal transmission timing of the terminal station 2. The successful transmission from the terminal station 2 may mean that the mobile relay station 3 can normally demodulate and decode the terminal uplink signal received from the terminal station 2. Alternatively, the mobile relay station 3 may determine the success of the transmission in the reception processing of a higher layer than a physical layer. For example, the mobile relay station 3 may determine that the transmission has succeeded when no error is detected in error detection processing using an error correction code in a data link layer, or may determine that the transmission has succeeded when no error is detected by an error detection function in a transport layer. A transmission condition of the terminal uplink signal when the transmission from the terminal station 2 has succeeded is referred to as a transmission success condition.

As the granularity of the distribution is made finer, it is possible to find a favorable condition based on a local section such as an area or a time zone. In particular, when there is a shielding object, an area having a common elevation angle with a high communication success rate is local. The mobile relay station 3 generates map information indicating the number of communication successes or the communication success rate of each transmission success condition for each section indicated by, for example, an area, a time zone, or a combination of the area and the time zone.

On the basis of the map information generated for each section, the mobile relay station 3 obtains a transmission condition having a high number of communication successes or a high communication success rate under constraint conditions indicated by the section. The mobile relay station 3 notifies the terminal station 2 of transmission control information indicating the transmission condition obtained for each section. Note that the map information may be directly used as the transmission control information. When area information is used for section, the mobile relay station 3 distributes transmission control information to the terminal stations 2 in the area. The transmission control information may be distributed from the mobile relay station 3 or the base station 4 to the terminal station 2 on a predetermined schedule such as periodically, or an instruction to update the transmission control information may be manually and periodically input to the terminal station 2, the mobile relay station 3, or the base station 4. In this manner, the transmission control information is automatically or manually updated. In addition, the mobile relay station 3 may transmit the generated map information to the base station 4, and the base station 4 may generate the transmission control information on the basis of the map information. The base station 4 notifies the terminal station 2 of the generated transmission control information. The terminal station 2, which is the transmission destination of the transmission control information, may be all the terminal stations 2 or a terminal station 2 with high priority. The terminal station 2 determines a transmission condition based on the transmission control information, and transmits the terminal uplink signal according to the determined transmission condition.

Figure 2:
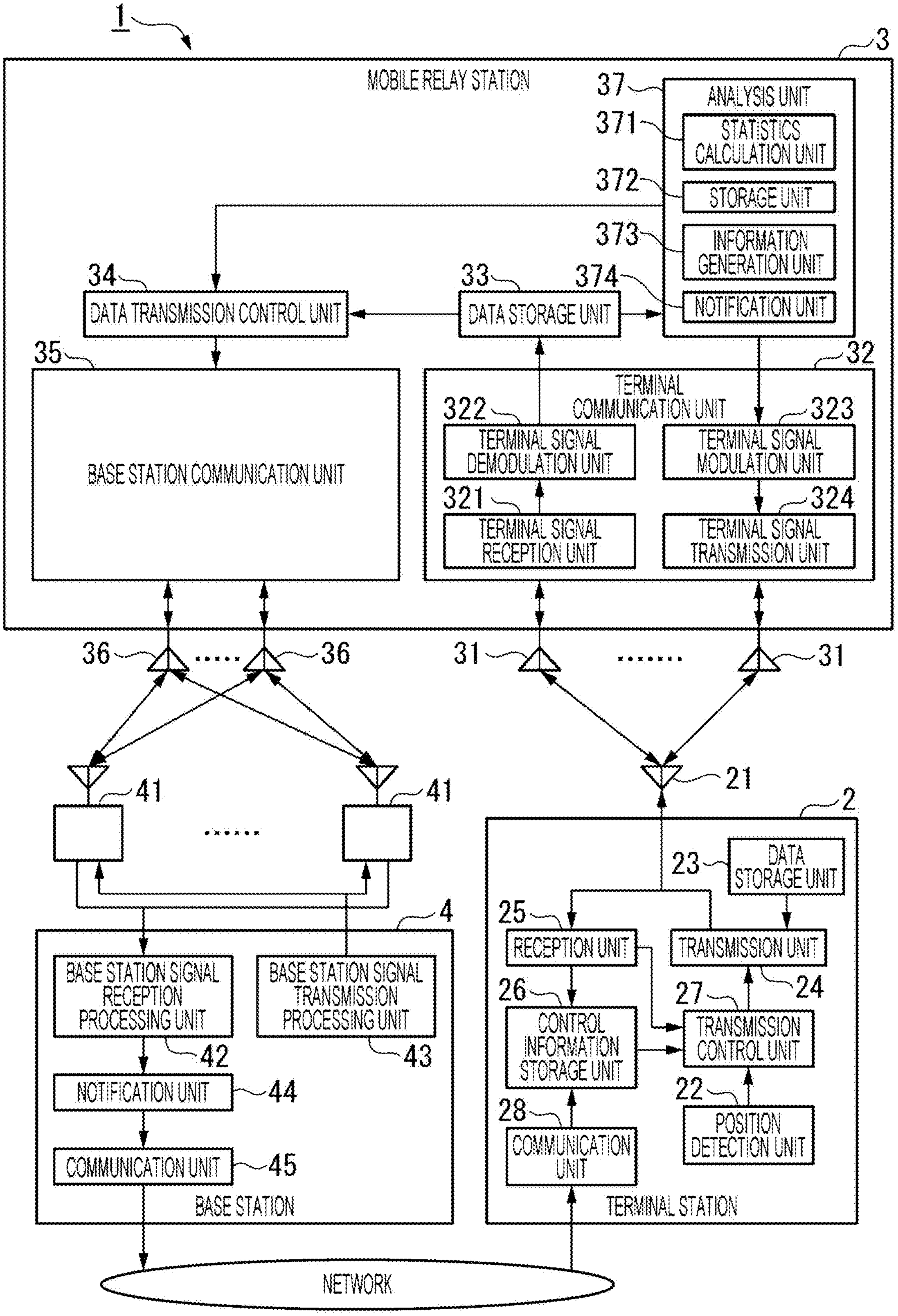
FIG. 2 is a configuration diagram of a wireless communication system according to the embodiment.

FIG. 2 is a configuration diagram of the wireless communication system 1. In FIG. 2, only functional blocks related to the present embodiment are extracted and illustrated.

The terminal station 2 includes one or a plurality of antennas 21, a position detection unit 22, a data storage unit 23, a transmission unit 24, a reception unit 25, a control information storage unit 26, a transmission control unit 27, and a communication unit 28.

The position detection unit 22 acquires position information indicating the position of the own station. For example, the position detection unit 22 detects the position of the own station using a global positioning system (GPS). The position detection unit 22 outputs the acquired position information to the transmission control unit 27. The data storage unit 23 stores sensor data or the like.

The transmission unit 24 transmits the terminal uplink signal using, for example, low power wide area (LPWA). The transmission unit 24 reads the sensor data from the data storage unit 23 as terminal transmission data. The transmission unit 24 generates the terminal uplink signal in which the terminal transmission data is set. The transmission unit 24 transmits the terminal uplink signal from the antenna 21 under the transmission condition determined by the transmission control unit 27.

The reception unit 25 performs reception processing of the terminal downlink signal received by the antenna 21. The reception unit 25 writes the transmission control information obtained from the terminal downlink signal by the reception processing in the control information storage unit 26. The control information storage unit 26 stores various data including the transmission control information.

The transmission control unit 27 determines the transmission condition of the terminal uplink signal. The transmission condition includes the number of transmissions of the same signal, a transmission number, a transmission interval, a transmission timing, and the like. The number of transmissions of the same signal N indicates that the same terminal uplink signal is transmitted N times in total, and the transmission number n indicates the n-th transmission among the number of transmissions of the same signal N. The transmission control unit 27 controls the transmission unit 24 to transmit the terminal uplink signal under the determined transmission condition.

The transmission control unit 27 sets a terminal ID of the own station, position information, transmission condition notification information, environment information, and the like in the terminal uplink signal transmitted by the transmission unit 24. The terminal ID is terminal identification information for specifying the terminal station 2. The transmission condition notification information indicates a transmission condition used for transmission of the terminal uplink signal. The environment information is information regarding the surrounding environment of the terminal station 2. The environment information is, for example, weather, a noise floor, or the like. After receiving the transmission control information, the transmission control unit 27 determines a transmission condition on the basis of the transmission control information stored in the control information storage unit 26.

The communication unit 28 communicates with the base station 4 via a network. The network is, for example, a communication network on the ground.

The mobile relay station 3 includes one or more antennas 31, a terminal communication unit 32, a data storage unit 33, a data transmission control unit 34, a base station communication unit 35, one or more antennas 36, and an analysis unit 37.

The terminal communication unit 32 performs wireless communication with the terminal station 2. The terminal communication unit 32 includes a terminal signal reception unit 321, a terminal signal demodulation unit 322, a terminal signal modulation unit 323, and a terminal signal transmission unit 324.

The terminal signal reception unit 321 receives the terminal uplink signal transmitted from each terminal station 2 via the antenna 31. The terminal signal demodulation unit 322 demodulates and decodes the terminal uplink signal received by the terminal signal reception unit 321, and acquires the terminal ID, the position information, the transmission condition notification information, the environment information, and the terminal transmission data transmitted by the terminal station 2. The terminal signal demodulation unit 322 writes, in the data storage unit 33, reception signal information in which these pieces of information obtained from the normally demodulated and decoded terminal uplink signal and the reception time of the terminal uplink signal are set.

The terminal signal modulation unit 323 encodes and modulates transmission data to the terminal station 2 to generate a terminal downlink signal. The terminal signal transmission unit 324 transmits the terminal downlink signal generated by the terminal signal modulation unit 323 via the antenna 31.

The data storage unit 33 stores the reception signal information. The reception signal information is information in which the reception time of the terminal uplink signal is associated with the terminal ID, the position information, the transmission condition notification information, the environment information, and the terminal transmission data obtained from the terminal uplink signal. Note that when the transmission condition notification information includes the transmission time, the reception signal information may not include the reception time. Further, the reception signal information may further include information of the transmission condition obtained on the basis of the reception time of the terminal uplink signal and the information set in the terminal uplink signal.

When the mobile relay station 3 can communicate with the base station 4, the data transmission control unit 34 outputs the transmission data to the base station 4 to the base station communication unit 35. For example, the data transmission control unit 34 reads the terminal ID, the reception time, and the terminal transmission data from the reception signal information, and outputs the terminal ID, the reception time, and the terminal transmission data to the base station communication unit 35 as transmission data to the base station 4.

The base station communication unit 35 encodes and modulates the transmission data to generate a base station downlink signal, and transmits the generated base station downlink signal via the antenna 36. In addition, the base station communication unit 35 receives the base station uplink signal transmitted from the base station 4 via the antenna 36, demodulates and decodes the received base station uplink signal, and obtains the data transmitted by the base station 4.

The analysis unit 37 includes a statistics calculation unit 371, a storage unit 372, an information generation unit 373, and a notification unit 374. The statistics calculation unit 371 analyzes the reception signal information stored in the data storage unit 33 and generates map information for each section. The statistics calculation unit 371 writes section information indicating the section and the map information generated for the section in the storage unit 372 in association with each other. The section information is indicated by values or value ranges of one or more classification items. The map information indicates the number of communication successes or the communication success rate for each transmission success condition. The transmission success condition is indicated by values or value ranges of one or more analysis items. As the classification item and the analysis item, information of a type that can be acquired from the reception signal information is used. The storage unit 372 stores data including map information for each section information and transmission control information for each section information.

On the basis of the map information associated with the section information, the information generation unit 373 obtains a transmission condition under which transmission is likely to succeed under the constraint condition indicated by the section information. The transmission condition is indicated by values or value ranges of one or more analysis items. The information generation unit 373 writes the section information and the transmission control information indicating the transmission condition under which the transmission is likely to succeed in the storage unit 372 in association with each other. Note that the transmission control information may be map information extracted for a range of transmission conditions under which transmission is likely to succeed, or may be map information as it is.

The notification unit 374 transmits the transmission control information read from the storage unit 372 to all the terminal stations 2 or terminal stations 2 with high priority. When the section information associated with the transmission control information includes area information, the notification unit 374 transmits the transmission control information to all the terminal stations 2 located in the area or terminal stations 2 with high priority. For example, the notification unit 374 transmits the transmission control information using the terminal downlink signal. Alternatively, the notification unit 374 may transmit the transmission control information to the terminal station 2 via the base station 4. In this case, the notification unit 374 transmits the transmission control information from the base station communication unit 35 using the base station downlink signal.

The base station 4 includes one or more antenna stations 41, a base station signal reception processing unit 42, a base station signal transmission processing unit 43, a notification unit 44, and a communication unit 45.

The antenna station 41 converts a base station downlink signal received from the mobile relay station 3 into an electric signal and outputs the electric signal to the base station signal reception processing unit 42. The base station signal reception processing unit 42 demodulates and decodes the base station downlink signal input from the antenna station 41 to obtain transmission data. The base station signal transmission processing unit 43 encodes and modulates the transmission data to the mobile relay station 3 to generate a base station uplink signal, and transmits the generated base station uplink signal from the antenna station 41.

When receiving the transmission control information from the mobile relay station 3, the notification unit 44 transmits the transmission control information to the terminal station 2. Note that when the section information associated with the transmission control information includes area information, the notification unit 44 transmits the transmission control information to the terminal station 2 located in the area. When the received transmission control information is map information, the notification unit 44 may acquire a condition under which transmission is likely to succeed from the map information and transmit the transmission control information in which the acquired condition is set to the terminal station 2. The communication unit 45 communicates with the terminal station 2 via the network.

FIG. 3 is a diagram illustrating an example of reception signal information. The reception signal information includes the reception time of the terminal uplink signal in the mobile relay station 3, the terminal ID, the position information, the transmission condition notification information, the environment information, and the sensor data obtained from the terminal uplink signal, and additional acquisition information. The transmission condition notification information indicates a transmission condition used for terminal uplink. The transmission condition notification information includes values of a transmission time, a channel, the number of channels, the number of transmissions of the same signal, a transmission number, and a transmission interval. The environment information includes values of weather and a noise floor. Since the reception time of the terminal uplink signal in the mobile relay station 3 and the transmission time included in the transmission condition notification information are substantially the same, it is sufficient if the reception signal information include any of these.

The additional acquisition information is information obtained by the mobile relay station 3 on the basis of one or both of the reception time and the data included in the terminal uplink signal. The additional acquisition information includes, for example, information of elevation angle. Normally, the orbit of an LEO satellite equipped with the mobile relay station 3 is determined in advance. Thus, the position information of the mobile relay station 3 at the timing when the terminal station 2 transmits the terminal uplink signal can be calculated using the orbit information of the LEO satellite. The orbit information is information from which it is possible to acquire the position of the LEO satellite for each time. On the other hand, the position of the terminal station 2 does not change significantly. Therefore, the elevation angle from the terminal station 2 to the mobile relay station 3 can be calculated on the basis of the position of the mobile relay station 3 at the transmission time or the reception time and the position of the terminal station 2.

Note that signal reception information may include a part of the information illustrated in FIG. 3. In addition, as the transmission condition notification information, the environment information, and the additional acquisition information, other information may be used as long as the information can be used to determine the transmission condition.

FIG. 4 is a diagram illustrating an example of map information. The map information is associated with the section information. The section information illustrated in FIG. 4 includes a value range of area and a value range of time zone. In addition, the map information illustrated in FIG. 4 indicates the number of communication successes for each value range of elevation angle and the number of communication successes for each value of the number of transmissions of the same signal. Note that the map information may be information indicating the number of communication successes for each combination of the value range of elevation angle and the value of the number of transmissions of the same signal. As described above, in the map information, the number of communication successes for each value or value range of an analysis item may be set, or the number of communication successes for each combination of values or value ranges of a plurality of analysis items may be set.

The classification item used for the section information and the analysis item used for the transmission success condition of the map information can be arbitrarily determined as long as they are information of a type obtained from the reception signal information. For example, the classification item is one or more of an area, a time zone, a day of the week, a month, weather, a noise floor, and the like. In addition, the analysis item used for the transmission success condition is one or more of an elevation angle, a channel, the number of channels, the number of transmissions of the same signal, a transmission interval, a time zone, a day of the week, a month, weather, a noise floor, and the like. However, the same information as that of the classification item used for the section information is not used for the analysis item of the transmission success condition. Note that even the same type of information can be used as the transmission success condition when the value or value range of the analysis item is a part of the value range of the classification item. For example, in a case where the section information includes the time zone 0:00 to 6:00, the time zones 0:00 to 2:00, 2:00 to 4:00, and 4:00 to 6:00 can be used as the transmission success condition.

For example, it is assumed that the number of communication successes and the communication success rate increase because interference is small in a time zone in which transmission by the peripheral terminal stations 2 is small. Thus, the time zone is used as the transmission success condition. The distribution of the number of communication successes or the communication success rate for each time zone indicated by the map information can be used for sorting the terminal stations 2 for each time zone.

Figure 5:
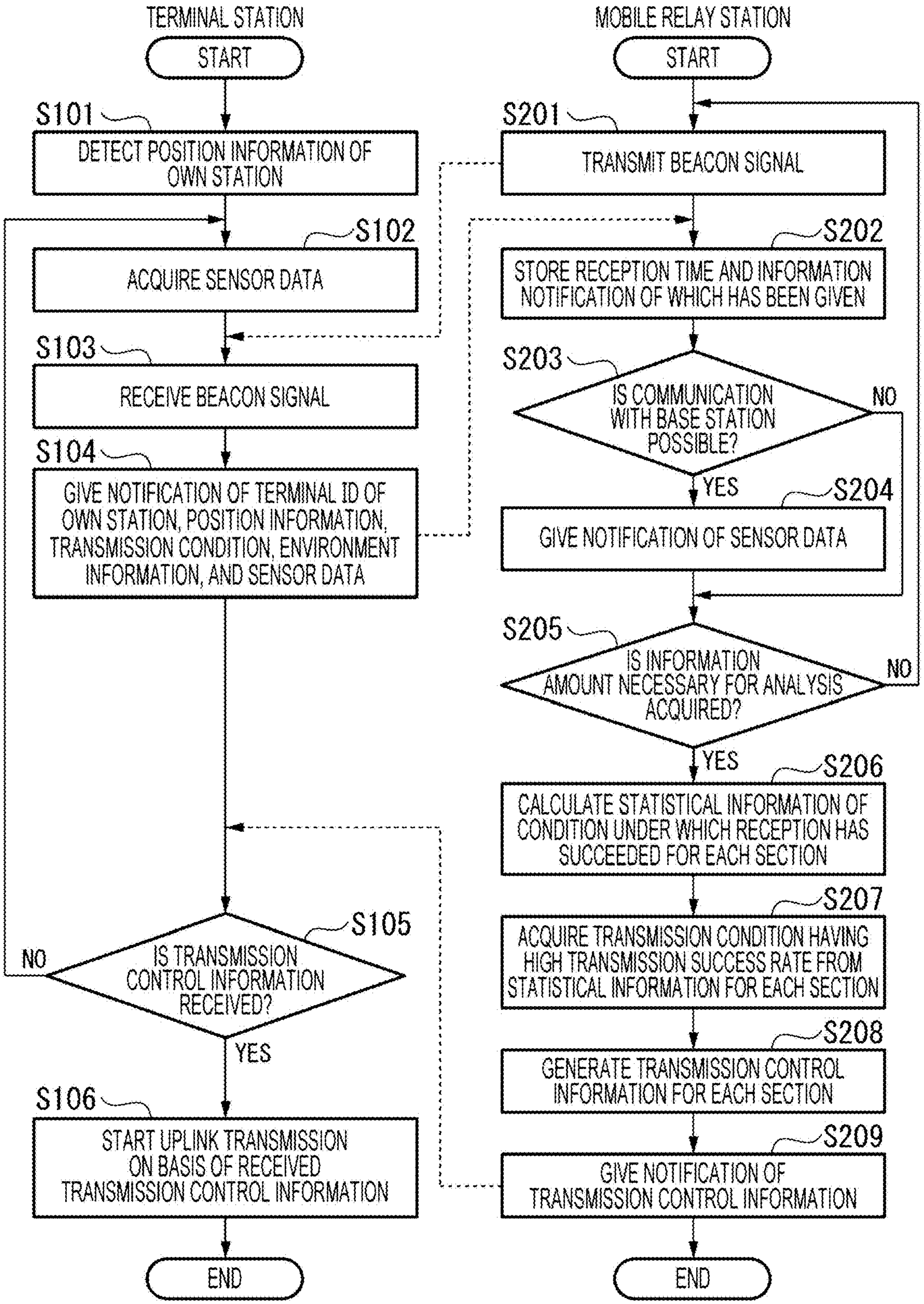
FIG. 5 is a flowchart illustrating operation of the wireless communication system according to the embodiment.

Operation of the wireless communication system 1 will be described. FIG. 5 is a flowchart illustrating processing of the wireless communication system 1. The wireless communication system 1 executes the processing of FIG. 5 at a predetermined timing such as every predetermined period or in a case where an instruction is manually input.

The position detection unit 22 of the terminal station 2 detects the position of the own station when the terminal station 2 is installed or periodically and outputs position information indicating the detected position to the transmission control unit 27 (step S101). Note that the terminal station 2 may not include the position detection unit 22. In this case, the position information is registered in the control information storage unit 26 at the time of installation of the terminal station 2 or the like. The terminal station 2 acquires data detected by a sensor, which is not illustrated, provided outside or inside at any time, and writes the acquired data in the data storage unit 23 (step S102).

On the other hand, the terminal communication unit 32 of the mobile relay station 3 transmits a beacon signal while moving (step S201). The reception unit 25 of the terminal station 2 receives the beacon signal transmitted from the mobile relay station 3 (step S103). The transmission control unit 27 instructs the transmission unit 24 to generate a terminal uplink signal in response to the reception of the beacon signal. Note that when the mobile relay station 3 does not transmit a beacon, the orbit information of the LEO satellite equipped with the mobile relay station 3 is stored in advance in the control information storage unit 26. The transmission control unit 27 acquires a time during which the mobile relay station 3 passes over the own station on the basis of the orbit information, and determines a time at which the terminal uplink signal is transmitted within the time. The transmission control unit 27 instructs the transmission unit 24 to generate the terminal uplink signal at the determined time.

The transmission unit 24 reads the sensor data from the data storage unit 23 as terminal transmission data. The transmission unit 24 generates the terminal uplink signal in which the terminal transmission data is set. The transmission control unit 27 determines transmission conditions such as a transmission timing, a channel, the number of transmissions of the same signal, a transmission interval in a case where the number of transmissions of the same signal is plural, and the number of channels in a case where a plurality of channels is used. Further, the transmission control unit 27 acquires the environment information of the own station. The environment information is, for example, weather, a noise floor of a use band, or the like. The transmission control unit 27 may acquire the environment information using a sensor or the like included in the own station, or may receive the environment information from another apparatus via a network. For example, the transmission control unit 27 may acquire weather environment information from another apparatus via the network every predetermined time, store the weather environment information in the control information storage unit 26, and read the stored environment information.

The transmission control unit 27 sets a terminal ID of the own station, position information, transmission condition notification information, and environment information in the terminal uplink signal generated by the transmission unit 24. The transmission condition notification information indicates a transmission condition used for a terminal uplink signal. The transmission condition notification information includes information such as a transmission time of the terminal uplink signal, a channel, the number of channels, the number of transmissions of the same signal, a transmission number, and a transmission interval. The transmission unit 24 wirelessly transmits the terminal uplink signal via the antenna 21 according to the transmission condition determined by the transmission control unit 27 for the terminal uplink signal (step S104). When the terminal station 2 has not received the transmission control information (step S105: NO), the terminal station 2 repeats the processing from step S102. Note that the terminal station 2 may repeat the processing from step S101.

The terminal signal reception unit 321 of the mobile relay station 3 receives, via the antenna 31, the terminal uplink signal transmitted from the terminal station 2 in step S104. The terminal signal demodulation unit 322 demodulates and decodes the terminal uplink signal, and acquires the terminal ID, the position information, the transmission condition notification information, the environment information, and the sensor data. When the terminal uplink signal is normally received, the terminal signal demodulation unit 322 writes, in the data storage unit 33, the reception signal information in which the reception time of the terminal uplink signal, the terminal ID, the position information, the transmission condition notification information, the environment information, and the sensor data are associated with each other (step S202).

The data transmission control unit 34 determines whether or not communication with the base station 4 is possible (step S203). For example, the data transmission control unit 34 may calculate in advance the time during which the mobile relay station 3 can communicate with the base station 4 on the basis of the orbit information of the LEO equipped with the mobile relay station 3 and the position of the base station 4. Alternatively, the data transmission control unit 34 may determine that communication is possible when the base station communication unit 35 receives the base station uplink signal from the base station 4. When determining that communication with the base station 4 is possible (step S203: YES), the data transmission control unit 34 reads the terminal ID, the reception time, and the sensor data from the data storage unit 33 as transmission data, and outputs the transmission data to the base station communication unit 35. The base station communication unit 35 wirelessly transmits the base station downlink signal in which the transmission data is set via the antenna 36 (step S204). The base station signal reception processing unit 42 of the base station 4 performs reception processing on the base station downlink signal received by the antenna station 41 from the mobile relay station 3 to obtain sensor data.

When the data transmission control unit 34 determines that communication with the base station 4 is impossible (step S203: NO), or after the processing of step S204, the mobile relay station 3 performs the processing of step S205. Note that the mobile relay station 3 may perform the processing of steps S203 to S204 and the processing of step S205 and subsequent steps in parallel. The statistics calculation unit 371 determines whether the reception signal information of an information amount necessary for analysis has been acquired (step S205). For example, when the reception signal information regarding a predetermined number or more of terminal uplink signals is acquired from all the terminal stations 2, the statistics calculation unit 371 determines that the reception signal information of the information amount necessary for analysis is acquired. Alternatively, the statistics calculation unit 371 may determine that the reception signal information of the information amount necessary for the analysis is acquired when the reception signal information for the predetermined time is acquired. When determining that the reception signal information of the information amount necessary for the analysis has not been acquired (step S205: NO), the statistics calculation unit 371 repeats the processing from step S201.

On the other hand, when determining that the reception signal information of the information amount necessary for the analysis has been acquired (step S205: YES), the statistics calculation unit 371 performs the processing of step S206. That is, the statistics calculation unit 371 calculates statistical information of the successfully received terminal uplink signal for each section by using the reception signal information stored in the data storage unit 33 (step S206).

First, the statistics calculation unit 371 acquires the additional acquisition information on the basis of the information set in the signal reception information, and sets the acquired additional acquisition information in the signal reception information. For example, the statistics calculation unit 371 reads the orbit information of the LEO satellite equipped with the mobile relay station 3 from the storage unit 372. The statistics calculation unit 371 calculates the position of the mobile relay station 3 at the reception time or the transmission time set in the signal reception information using the orbit information. The statistics calculation unit 371 calculates an elevation angle to the calculated position of the mobile relay station 3 from the position of the terminal station 2 read from the signal reception information. The statistics calculation unit 371 sets the calculated elevation angle in the additional acquisition information of the signal reception information.

Subsequently, the statistics calculation unit 371 reads the section information and the transmission success condition from the storage unit 372. Note that the section information and the transmission success condition stored in the storage unit 372 can be changed at any timing by transmitting the changed section information and transmission success condition from the base station 4 to the mobile relay station 3. Note that a section information generation rule may be stored in place of the section information, and a transmission success condition generation rule may be stored in place of the transmission success condition in the storage unit 372. For example, when an area is used as a classification item of the section information, a unit for dividing the ground into areas may be stored as the generation rule. In addition, when the number of channels is used as an analysis item of the transmission success condition, the fact that the number of channels is each value from 1 to 5 may be recorded as the transmission success condition generation rule. The statistics calculation unit 371 generates the section information and the transmission success condition according to these generation rules.

The statistics calculation unit 371 classifies the reception signal information according to the section information. The classification item used for the section information is, for example, one or more of an area, a time zone, a day of the week, a month, weather, a noise floor, and the like. In order to set the reception signal information to the area, the position information set in the signal reception information is referred to. In addition, in order to set the signal reception information to the time zone, the day of the week, or the month, the reception time or the transmission time set in the signal reception information is referred to.

For example, it is assumed that a classification item used for section information is the area. The statistics calculation unit 371 classifies the signal reception information into the signal reception information of areas A, B, . . . on the basis of the section information indicating each of the latitude and longitude range of the area A, the latitude and longitude range of the area B, . . . . In addition, when the classification item used for the section information is the area and the time zone, the statistics calculation unit 371 classifies the signal information into the signal reception information of each time zone of the area A, each time zone of the area B, . . . .

For each section information, the statistics calculation unit 371 generates map information obtained from the reception signal information classified into the section information as statistical information. The map information indicates the number of communication successes or the communication success rate of the terminal uplink signal for each transmission success condition. The analysis item used for the transmission success condition is one or more of an elevation angle, a channel, the number of channels, the number of transmissions of the same signal, a transmission interval, a time zone, a day of the week, a month, weather, a noise floor, and the like.

The terminal uplink signal in which the signal reception information is written in the data storage unit 33 indicates that the reception succeeds. Thus, the statistics calculation unit 371 specifies the reception signal information matching the transmission success condition within the reception signal information classified on the basis of the section information, and sets the number of specified reception signal information as the number of communication successes. Note that the communication success rate is calculated when the number of transmissions of the same signal is set in the transmission condition notification information. Specifically, the statistics calculation unit 371 extracts the reception signal information matching the transmission success condition within the reception signal information classified on the basis of the section information. Further, the statistics calculation unit 371 specifies, from within the extracted reception signal information, signal reception information in which the same terminal ID is set and the reception time or the transmission time included within a predetermined time is set. The predetermined time is, for example, a time during which the mobile relay station 3 passes over the terminal station 2 or a time slightly longer than the time. The statistics calculation unit 371 calculates the communication success rate by dividing the number of pieces of specified signal reception information by the number of transmissions of the same signal set in the signal reception information.

As described above, for example, the statistics calculation unit 371 can generate map information indicating the number of communication successes for each elevation angle of each area, map information indicating the number of communication successes for each combination of the elevation angle of each area and the number of transmissions of the same signal, and the like. The statistics calculation unit 371 writes the section information and the map information generated on the basis of the signal reception information classified into the section information in the storage unit 372 as statistical information.

The information generation unit 373 obtains, for each section information, a value range of an analysis item for which the number of communication successes or the communication success rate is higher than a predetermined condition on the basis of the map information (step S207). For example, the predetermined condition can be a value higher than a threshold. The threshold may be a predetermined value or a value obtained by multiplying the maximum number of communication successes or communication success rate by a coefficient $\alpha$ ($0<\alpha<1$). In addition, for example, the predetermined condition may be a value in a predetermined range centered on the value of the analysis item for which the maximum number of communication successes or communication success rate has been obtained. The information generation unit 373 extracts map information of the obtained value range of the analysis item for each section information, and generates transmission control information (step S208). Alternatively, the information generation unit 373 may use the obtained value range of the analysis item as the transmission control information. In this case, the number of communication successes and the communication success rate are not included in the transmission control information. In addition, the information generation unit 373 may use the map information as it is as the transmission control information. The information generation unit 373 writes the transmission control information generated for each section information in the storage unit 372.

The notification unit 374 of the mobile relay station 3 reads, from the storage unit 372, the transmission control information to be transmitted to a terminal station 2, the terminal station 2 being included in the current communication area or with high priority. The information of the terminal station 2 with high priority is stored in advance in the storage unit 372. In addition, for example, when the area information is included in the section information, the notification unit 374 reads the section information in which the current communication area is set and the transmission control information associated with the section information. The notification unit 374 outputs the read section information and transmission control information to the terminal signal modulation unit 323 as the transmission data. The terminal signal modulation unit 323 encodes and modulates the transmission data to generate a terminal downlink signal addressed to the terminal station 2. The terminal signal transmission unit 324 transmits the terminal downlink signal generated by the terminal signal modulation unit 323 via the antenna 31 (step S209).

The reception unit 25 of the terminal station 2 receives the terminal downlink signal via the antenna 21 (step S105: YES). The reception unit 25 acquires the section information and the transmission control information from the received terminal downlink signal. The control information storage unit 26 stores the section information and the transmission control information acquired by the reception unit 25. Thereafter, the transmission control unit 27 performs control to transmit the terminal uplink from the transmission unit 24 according to the transmission condition determined on the basis of the transmission control information (step S106).

That is, the transmission unit 24 generates a terminal uplink signal in which the sensor data read from the data storage unit 23 is set as terminal transmission data. The transmission control unit 27 selects the transmission control information to be used for determining the transmission condition on the basis of the section information added to the transmission control information. For example, the transmission unit 24 specifies the section information matching the current situation on the basis of the current time, the current weather, and the current noise floor, and selects the transmission control information associated with the specified section information. Note that when only the area is used for the section information and only the transmission control information of the area is distributed to the terminal station 2, selection based on the section information can be omitted.

The transmission control unit 27 determines transmission conditions such as a transmission timing, a channel, the number of transmissions of the same signal, a transmission interval, and the number of channels on the basis of the selected transmission control information. Note that the transmission unit 24 determines a transmission condition not included in the transmission control information on the basis of an arbitrary rule. In a case where the transmission control information indicates the number of communication successes or the communication success rate for each transmission condition indicated by the numerical range of each item, the transmission control unit 27 selects a value of each item to be a transmission condition with a probability obtained by performing weighting according to the number of communication successes or the communication success rate or randomly from the numerical range. In addition, the transmission control unit 27 may select the value of each item such that the probability that a value within the numerical range set in the transmission control information is selected is high and the probability that a value outside the numerical range is selected is low.

For example, it is assumed that a transmission condition indicating the number of transmissions of the same signal 2 to 4 and the number of channels 1 to 3, the number of communication successes or communication success rate $p_a$ of the number of transmissions of the same signal a (a=2, 3, and 4), and the number of communication successes or communication success rate $k_b$ of the number of channels b (b=1, 2, and 3) are set in the transmission control information. In this case, the transmission control unit 27 selects the number of transmissions of the same signal by weighting such that the number of transmissions of the same signal a has a probability of $p_a/(p_2+p_3+p_4)$. Further, the transmission control unit 27 selects the number of transmissions of the same signal by weighting such that the number of channels b has a probability of $p_b/(p_1+p_2+p_3)$. In addition, in a case where the number of transmissions of the same signal 2 to 4 and the number of channels 1 to 3 are set in the transmission control information, and the number of communication successes and the communication success rate are not set in the transmission control information, the transmission control unit 27 may select the number of transmissions of the same signal 2, 3, and 4 with the same probability, and select the number of channels 1, 2, and 3 with the same probability. In addition, the transmission control unit 27 may select each of the number of transmissions of the same signal and the number of channels with a probability obtained by performing weighting such that the median or the average has a higher weight.

In addition, in a case where the number of communication successes is set for each combination of a plurality of items in the transmission control information, the transmission control unit 27 determines the transmission condition for the combination of the items in the same manner as described above. For example, it is assumed that a transmission condition indicating the number of transmissions of the same signal 2 to 4 and the number of channels 1 to 3 and the numbers of communication successes or communication success rate of (the number of transmissions of the same signal a, the number of channels b) each being $p_{ab}$ are set in the transmission control information. In this case, the transmission control unit 27 selects (the number of transmissions of the same signal a, the number of channels b) with a probability of $p_{ab}/(p_{21}+p_{22}+p_{23}+p_{31}+p_{32}+p_{33}+p_{41}+p_{42}+p_{43})$.

Note that, in a case where the value of the elevation angle is determined as the transmission condition, the transmission control unit 27 calculates the transmission time at which the elevation angle from the own station to the mobile relay station 3 becomes the determined value on the basis of the position of the own station and the orbit information of the LEO satellite equipped with the mobile relay station 3. The transmission control unit 27 controls the transmission unit 24 to transmit the terminal uplink signal at the calculated transmission time.

In addition, in a case where the transmission control information includes items that cannot be controlled by the terminal station 2, such as a time zone, a day of the week, weather, and a noise floor, the transmission control unit 27 limits available transmission conditions among the transmission conditions indicated by the transmission control information by the values of the items. The transmission control unit 27 selects a value of each item to be a transmission condition with a probability obtained by performing weighting according to the number of communication successes or the communication success rate or randomly from a value range of each item indicated by the limited transmission condition.

For example, it is assumed that the fact that the number of transmissions of the same signal a1=2 to 4, the number of channels b1=1 to 3, and the numbers of communication successes of (the number of transmissions of the same signal a1, the number of channels b1) are each $p_{ab}$ in time zones t1 to t2, and the number of transmissions of the same signal a2=2 to 4, the number of channels b2=2 to 3, and the numbers of communication successes of (the number of transmissions of the same signal a2, the number of channels b2) are each $q_{ab}$ in time zones t2 to t3 is set in the transmission control information. In a case where the current time t is within time zones t2 to t3, the transmission control unit 27 selects the number of transmissions of the same signal and the number of channels from the number of transmissions of the same signal a2=2 to 4 and the number of channels b2=2 to 3 on the basis of the number of communication successes $q_{ab}$ of (the number of transmissions of the same signal a2, the number of channels b2).

After step S106, the transmission control unit 27 may not set the transmission condition notification information and the environment information in the terminal uplink signal. Upon receiving the terminal uplink signal transmitted from the terminal station 2, the mobile relay station 3 performs operations similar to those in steps S202 to S204. However, the mobile relay station 3 may not acquire the transmission condition information and the environment information.

Note that, in step S104, the terminal station 2 may not set, in the terminal uplink signal, information that is not used for the classification item or the analysis item. In addition, the statistics calculation unit 371 of the mobile relay station 3 may generate statistical information for a combination of a plurality of types of classification items and analysis items, and select statistical information using a combination of classification items and analysis items in which a peak appears in the number of communication successes or the communication success rate as statistical information for generating the transmission control information.

In the present embodiment, it is not possible to detect the number of times the terminal uplink signal could not be normally received (hereinafter, described as failure) or the statistical parameter of the terminal station 2. Thus, when the number of transmissions of the same signal is not set in the terminal uplink signal, or when many terminal uplink signals are transmitted only once, a communication success rate cannot be obtained. For example, in a case where five terminal stations 2 out of six terminal stations 2 succeed in transmission at elevation angle θ1 and five terminal stations 2 out of 50 terminal stations 2 succeed in transmission at elevation angle θ2 in a certain area, the number of communication successes is the same but the communication success rate is different. However, as described below, if the number of communication successes is obtained, the communication success rate may not be obtained.

In the case of the above example, since the number of communication successes is equal, the probability that the terminal station 2 selects the elevation angle θ1 and the elevation angle θ2 at the next transmission opportunity is about the same. Then, in the next transmission opportunity, the number of communication successes at the elevation angle θ1 increases, and the number of communication successes at the elevation angle θ2 decreases. When the wireless communication system 1 periodically repeats the processing of FIG. 5, the statistical parameter naturally increases for a condition with a high communication success rate. Thus, even when the statistical parameter or the number of failures is unknown, the terminal station 2 can transmit the terminal uplink signal under a transmission condition with a high communication success rate. Note that when access is tight, the noise floor of the band increases. Therefore, it is conceivable to generate map information of the number of communication successes using the noise floor as an analysis item.

It is also assumed that the statistical information created once changes depending on an increase or decrease in the number of terminal stations 2 in the wireless communication system 1, a change in the communication environment, and the like. In consideration of this, the analysis unit 37 may set a finite period that can be used as the statistical information and generate the transmission control information using the statistical information of the moving average. In addition, the analysis unit 37 may create statistical information for each different environment. For example, the analysis unit 37 may create statistical information for each environmental condition such as the number of terminal stations 2 in the area or weather.

In an urban area, since the number of constant transmissions from the terminal station 2 is large, in other areas, the communication success rate is improved when the own area is within the coverage and the urban area is outside the coverage. In such a case, fixed information such as the number of terminals in other areas may be further used as the section information.

Second Embodiment

In the second embodiment, a base station generates transmission condition information. In the description below, differences from the first embodiment will be mainly described.

Figure 6:
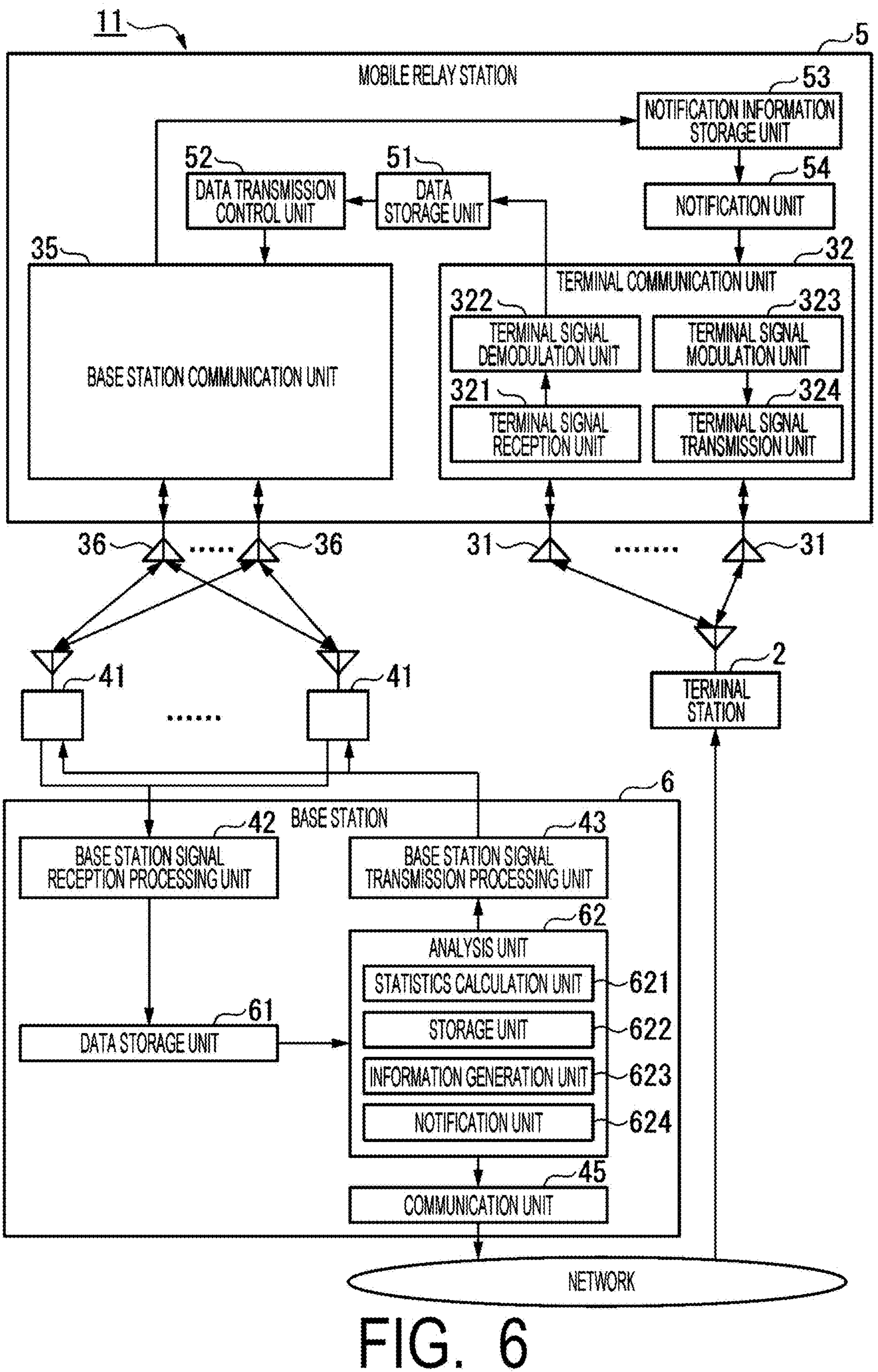
FIG. 6 is a configuration diagram of a wireless communication system according to a second embodiment.

FIG. 6 is a configuration diagram of a wireless communication system 11 according to the second embodiment. The wireless communication system 11 includes a terminal station 2, a mobile relay station 5, and a base station 6. The wireless communication system 11 illustrated in FIG. 6 is different from the wireless communication system 1 of the first embodiment illustrated in FIG. 2 in that the mobile relay station 5 is provided instead of the mobile relay station 3 and the base station 6 is provided instead of the base station 4.

The mobile relay station 5 is different from the mobile relay station 3 of the first embodiment in that a data storage unit 51, a data transmission control unit 52, a notification information storage unit 53, and a notification unit 54 are provided instead of the data storage unit 33, the data transmission control unit 34, and the analysis unit 37. The data storage unit 51 stores signal reception information similar to that of the first embodiment. However, the signal reception information stored in the data storage unit 51 does not include the additional acquisition information. The data transmission control unit 52 outputs the signal reception information stored in the data storage unit 51 to the base station communication unit 35 as transmission data to the base station 6. The notification information storage unit 53 stores the transmission control information received from the base station 6. The notification unit 54 reads the transmission control information from the notification information storage unit 53, and notifies the terminal station 2 of the read transmission control information by processing similar to that of the notification unit 374 of the first embodiment.

The base station 6 is different from the base station 4 illustrated in FIG. 2 in that a data storage unit 61 and an analysis unit 62 are provided instead of the notification unit 44. The data storage unit 61 stores the signal reception information. The analysis unit 62 includes a statistics calculation unit 621, a storage unit 622, an information generation unit 623, and a notification unit 624. The statistics calculation unit 621, the storage unit 622, and the information generation unit 623 perform the processing similar to those of the statistics calculation unit 371, the storage unit 372, and the information generation unit 373 included in the analysis unit 37 of the mobile relay station 3 according to the first embodiment illustrated in FIG. 2, respectively. The notification unit 624 transmits the transmission control information associated with the section information to the mobile relay station 5. The mobile relay station 5 distributes the received transmission control information to all the terminal stations 2 or the terminal station 2 with high priority. Alternatively, the notification unit 624 may distribute the transmission control information to each terminal station 2.

Figure 7:
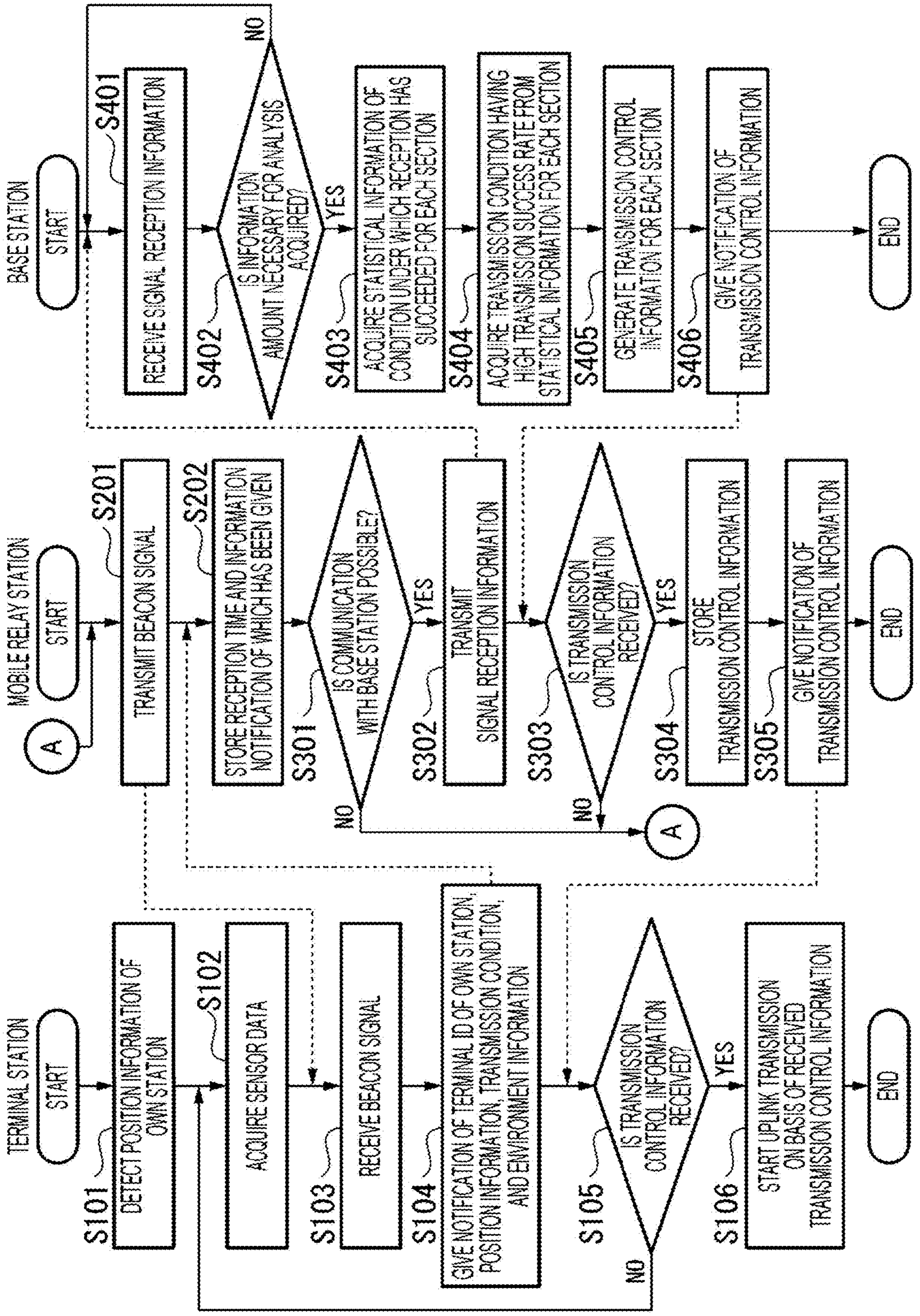
FIG. 7 is a flowchart illustrating operation of the wireless communication system according to the embodiment.

FIG. 7 is a flowchart illustrating processing of the wireless communication system 11. In FIG. 7, the same processing as that in the first embodiment in FIG. 5 will be denoted by the same reference signs, and detailed description thereof will be omitted. The wireless communication system 11 executes the processing of FIG. 7 at a predetermined timing such as every predetermined period or in a case where an instruction is manually input.

The processing in steps S101 to S105 of the terminal station 2 and the processing in steps S201 to S202 of the mobile relay station 5 are similar to those in the first embodiment. However, in step S202, the terminal signal demodulation unit 322 writes, in the data storage unit 51, the reception signal information in which the reception time of the terminal uplink signal, the terminal ID, the position information, the transmission condition notification information, the environment information, and the sensor data are associated with each other.

The data transmission control unit 52 determines whether or not communication with the base station 6 is possible by processing similar to step S203 in FIG. 5 (step S301). When determining that communication with the base station 6 is impossible (step S301: NO), the data transmission control unit 52 performs the processing from step S201.

When determining that communication with the base station 6 is possible (step S301: YES), the data transmission control unit 52 reads reception signal information from the data storage unit 51 and outputs the reception signal information to the base station communication unit 35. The base station communication unit 35 wirelessly transmits the base station downlink signal in which the reception signal information is set via an antenna 36 (step S302). The mobile relay station 5 determines whether transmission control information has been received (step S303). When the mobile relay station 5 has not received the transmission control information (step S303: NO), the mobile relay station 5 repeats the processing from step S201.

On the other hand, an antenna station 41 of the base station 6 receives the base station downlink signal transmitted in step S302. The base station signal reception processing unit 42 performs reception processing on the base station downlink signal received by the antenna station 41 from the mobile relay station 5 to obtain signal reception information. The base station signal reception processing unit 42 writes the obtained signal reception information in the data storage unit 61 (step S401).

The analysis unit 62 of the base station 6 performs processing similar to those in steps S205 to S208 of the analysis unit 37 of the mobile relay station 3 of the first embodiment illustrated in FIG. 5 (steps S402 to S405). That is, when determining that the reception signal information of the information amount necessary for the analysis has not been acquired (step S402: NO), the statistics calculation unit 621 repeats the processing from step S401. When determining that the reception signal information of the information amount necessary for the analysis has been acquired (step S403: YES), the statistics calculation unit 621 calculates the statistical information for each section information by using the reception signal information stored in the data storage unit 61 (step S403). The statistics calculation unit 621 generates map information indicating the number of communication successes or the communication success rate of the terminal uplink signal for each transmission success condition as statistical information using information obtained from the reception signal information for each section information, and writes the statistical information in the storage unit 622. The information generation unit 623 obtains, for each section information, a value range of an analysis item for which the number of communication successes or the communication success rate is higher than a predetermined condition on the basis of the map information (step S404). The information generation unit 623 generates, for each section information, map information extracted for the obtained value range of the analysis item or transmission control information in which the calculated value range of the analysis item is set (step S405). The information generation unit 623 may use the map information as the transmission control information. The information generation unit 623 writes the transmission control information for each section information in the storage unit 622.

When the base station 6 can communicate with the mobile relay station 5, the notification unit 624 reads the transmission control information from the storage unit 622. For example, the notification unit 624 may calculate in advance the time during which the base station 6 can communicate with the mobile relay station 5 on the basis of the orbit information of the LEO equipped with the mobile relay station 5 and the position of the base station 6. Alternatively, the notification unit 624 may determine that communication is possible when the base station signal reception processing unit 42 of the base station 6 receives a beacon from the mobile relay station 5. The notification unit 624 outputs the read transmission control information to the base station signal transmission processing unit 43. The base station signal transmission processing unit 43 generates a base station uplink signal in which the transmission control information is set, and transmits the generated base station uplink signal from the antenna station 41 (step S406).

The base station communication unit 35 of the mobile relay station 5 receives the base station downlink signal in which the transmission control information is set via the antenna 36 (step S303: YES). The base station communication unit 35 writes the transmission control information obtained by performing the reception processing of the received base station uplink signal in the notification information storage unit 53 (step S304).

The notification unit 54 transmits the transmission control information to all the terminal stations 2 included in the current communication area of the mobile relay station 5 or the terminal station 2 with high priority by the same processing as that in step S209 in FIG. 5 (step S305). The information of the terminal station 2 with high priority is stored in advance in the notification information storage unit 53. In addition, for example, when the area information is included in the section information, the notification unit 54 reads the section information in which the current communication area is set and the transmission control information associated with the section information from the notification information storage unit 53. The notification unit 54 transmits the read section information and transmission control information from the terminal communication unit 32 using the terminal downlink signal.

The terminal station 2 receives the terminal downlink signal via the antenna 21, and performs processing similar to that of the first embodiment illustrated in FIG. 3. That is, the reception unit 25 of the terminal station 2 receives the terminal downlink signal via the antenna 21 (step S105: YES). The reception unit 25 stores the section information and the transmission control information obtained from the terminal downlink signal in the control information storage unit 26. Thereafter, the transmission control unit 27 performs control to transmit the terminal uplink from the transmission unit 24 according to the transmission condition determined on the basis of the transmission control information (step S106).

Note that a communication control apparatus that is an external apparatus connected to the base station 6 may include the analysis unit 62. The communication control apparatus may further include the data storage unit 61. The communication control apparatus may further include the communication unit 45, and distribute the generated transmission control information to the terminal station 2.

According to the present embodiment, it is possible to generate communication control information while reducing the load on the mobile relay station 5.

Third Embodiment

In the third embodiment, a base station demodulates a terminal uplink signal and generates transmission condition information. In the description below, differences from the first and second embodiments will be mainly described.

Figure 8:
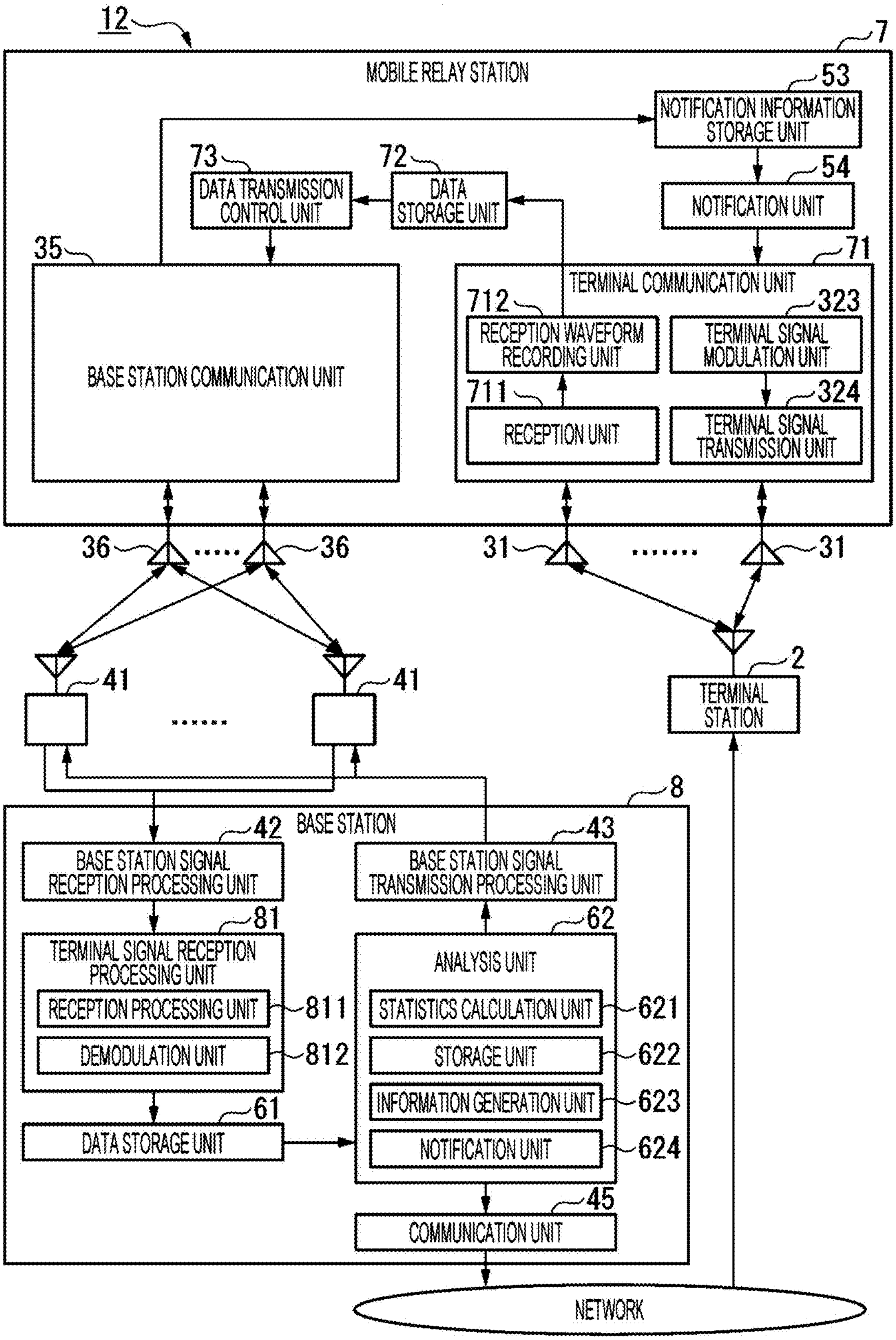
FIG. 8 is a configuration diagram of a wireless communication system according to a third embodiment.

FIG. 8 is a configuration diagram of a wireless communication system 12 according to the third embodiment. The wireless communication system 12 includes a terminal station 2, a mobile relay station 7, and a base station 8. The wireless communication system 12 illustrated in FIG. 8 is different from the wireless communication system 11 of the second embodiment illustrated in FIG. 6 in that the mobile relay station 7 is provided instead of the mobile relay station 5 and the base station 8 is provided instead of the base station 6.

The mobile relay station 7 is different from the mobile relay station 5 illustrated in FIG. 6 in that a terminal communication unit 71, a data storage unit 72, and a data transmission control unit 73 are provided instead of the terminal communication unit 32, the data storage unit 51, and the data transmission control unit 52.

The terminal communication unit 71 includes a reception unit 711, a reception waveform recording unit 712, a terminal signal modulation unit 323, and a terminal signal transmission unit 324. The reception unit 711 receives a signal via an antenna 31. The reception unit 711 down-converts the reception signal and frequency-converts the reception signal from an RF signal to a baseband signal. The reception waveform recording unit 712 samples the reception waveform of the reception signal subjected to the frequency conversion by the reception unit 711 to generate waveform data indicating a value obtained by the sampling. The reception waveform recording unit 712 writes reception waveform information in which the reception time of the reception signal and the waveform data are set in the data storage unit 72. The data storage unit 72 stores the reception waveform information generated by the reception waveform recording unit 712. The data transmission control unit 73 outputs the reception waveform information stored in the data storage unit 72 to the base station communication unit 35 as transmission data.

The base station 8 is different from the base station 6 illustrated in FIG. 6 in that a terminal signal reception processing unit 81 is further provided. The terminal signal reception processing unit 81 inputs the reception waveform information obtained by demodulating and decoding the base station downlink signal by the base station signal reception processing unit 42. The terminal signal reception processing unit 81 performs reception processing for the reception signal indicated by the reception waveform information. The terminal signal reception processing unit 81 includes a reception processing unit 811 and a demodulation unit 812. The reception processing unit 811 performs the FFT after converting the reception signal indicated by the waveform data from an analog signal to a digital signal. The reception processing unit 811 outputs the reception signal subjected to the FFT to the demodulation unit 812. The demodulation unit 812 performs processing similar to that of the terminal signal demodulation unit 322 of the mobile relay station 3 of the first embodiment illustrated in FIG. 2.

Figure 9:
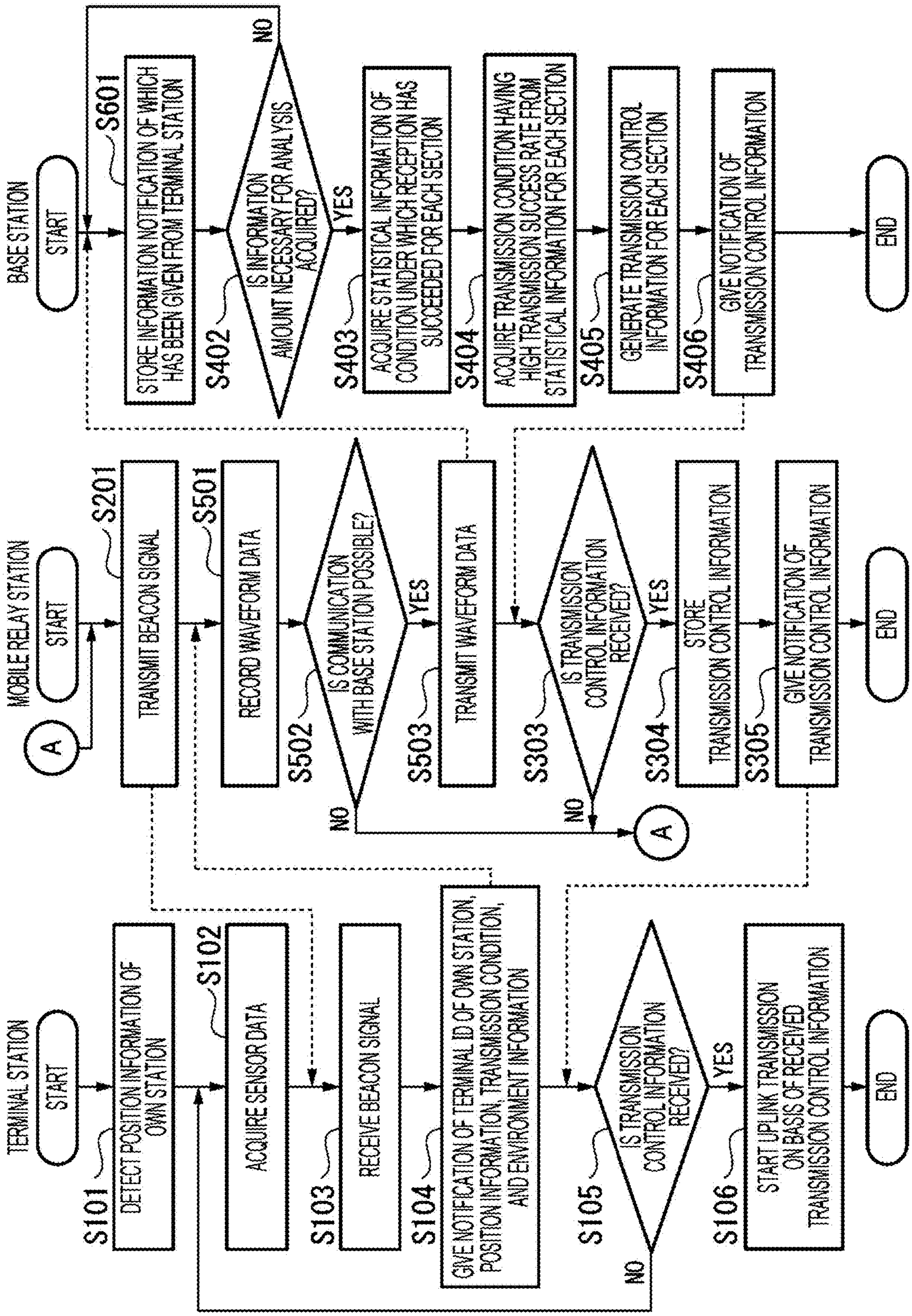
FIG. 9 is a flowchart illustrating operation of the wireless communication system according to the embodiment.

FIG. 9 is a flowchart illustrating processing of the wireless communication system 12. In FIG. 9, the same processing as that in the second embodiment in FIG. 7 will be denoted by the same reference signs, and detailed description thereof will be omitted. The wireless communication system 12 executes the processing of FIG. 9 at a predetermined timing such as every predetermined period or in a case where an instruction is manually input.

The processing in steps S101 to S105 of the terminal station 2 and the processing in step S201 of the mobile relay station 7 are similar to those in the first embodiment. The antenna 31 of the mobile relay station 7 receives the terminal uplink signal transmitted by the terminal station 2 in step S104. The reception unit 711 down-converts the terminal uplink signal received via the antenna 31. The reception waveform recording unit 712 samples the reception waveform of the down-converted terminal uplink signal, and generates waveform data indicating a value obtained by the sampling. The reception waveform recording unit 712 writes reception waveform information in which the reception time of the reception signal and the waveform data are set in the data storage unit 72 (step S501).

The data transmission control unit 73 determines whether or not communication with the base station 8 is possible by processing similar to step S203 in FIG. 5 (step S502). When determining that communication with the base station 8 is impossible (step S502: NO), the data transmission control unit 73 performs the processing from step S201.

When determining that communication with the base station 8 is possible (step S502: YES), the data transmission control unit 73 reads reception waveform information from the data storage unit 72 and outputs the reception waveform information to the base station communication unit 35. The base station communication unit 35 wirelessly transmits the base station downlink signal in which the reception waveform information is set via an antenna 36 (step S503). After the processing of step S503, the mobile relay station 7 performs the processing from step S303. The processing of step S303 and subsequent steps of the mobile relay station 7 and the processing of step S106 of the terminal station 2 are similar to those in the second embodiment.

On the other hand, an antenna station 41 of the base station 8 receives the base station downlink signal transmitted in step S503. The base station signal reception processing unit 42 performs reception processing on the base station downlink signal received by the antenna station 41 from the mobile relay station 3 to obtain reception waveform information. The reception processing unit 811 of the terminal signal reception processing unit 81 reads the waveform data from the reception waveform information. The reception processing unit 811 performs the FFT after converting the terminal uplink signal indicated by the waveform data from an analog signal to a digital signal. The demodulation unit 812 demodulates and decodes the terminal uplink signal subjected to the FFT, and acquires the terminal ID, the position information, the transmission condition notification information, the environment information, and the sensor data. When the reception processing of the terminal uplink signal is normally performed, the demodulation unit 812 writes, in the data storage unit 61, reception signal information in which the reception time of the terminal uplink signal acquired from the reception waveform information, the terminal ID, the position information, the transmission condition notification information, the environment information, and the sensor data obtained from the terminal uplink signal are associated with each other (step S601).

The processing of the base station 8 from the subsequent step S402 is similar to that in the second embodiment. However, in step S402, when determining that the reception signal information of the information amount necessary for the analysis has not been acquired (step S402: NO), the statistics calculation unit 621 repeats the processing from step S601.

Note that a communication control apparatus that is an external apparatus connected to the base station 8 may include the analysis unit 62. The communication control apparatus may further include the data storage unit 61. The communication control apparatus may further include the communication unit 45, and distribute the generated transmission control information to the terminal station 2.

According to the present embodiment, it is possible to generate communication control information while reducing the load on the mobile relay station 7. In addition, even when the wireless communication scheme used for the terminal station 2 is changed or added, it is sufficient if the wireless communication scheme is implemented in the base station 8, and the mobile relay station 7 may not be updated.

The wireless communication system of the present embodiment analyzes a transmission condition with a high communication success rate on the basis of statistical information when the terminal station performs transmission by the autonomous distributed control LPWA method under the condition that the communication environment has high periodicity and reproducibility. The terminal station selects a transmission condition such as a transmission timing using the analysis result, and performs transmission under the selected transmission condition. As a result, highly reliable communication is possible.

Figure 10:
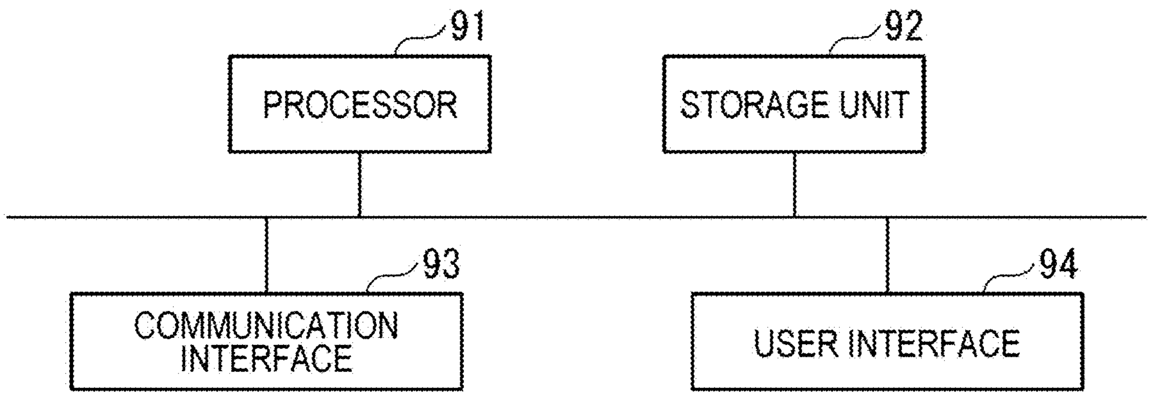
FIG. 10 is a hardware configuration diagram of a mobile relay station according to the first embodiment.

A hardware configuration example of the mobile relay station 3 will be described. FIG. 10 is a device configuration diagram illustrating a hardware configuration example of the mobile relay station 3. The mobile relay station 3 includes a processor 91, a storage unit 92, a communication interface 93, and a user interface 94.

The processor 91 is a central processing device that performs calculation and control. The processor 91 is, for example, a central processing unit (CPU). The storage unit 92 is a storage device such as various memories or a hard disk. The processor 91 reads a program from the storage unit 92 and executes the program, thereby implementing the analysis unit 37. Some of the functions of the analysis unit 37 may be implemented using hardware such as an application specific integrated circuit (ASIC), a programmable logic device (PLD), or a field programmable gate array (FPGA). The storage unit 92 further includes a work area and the like to be used when the processor 91 executes various programs. The communication interface 93 is communicatively connected with another device. The communication interface 93 corresponds to the terminal communication unit 32 and the base station communication unit 35. The user interface 94 is an input device such as a keyboard, a pointing device (a mouse, a tablet, etc.), a button, or a touch panel, or a display device such as a display. Artificial operations are inputted through the user interface 94.

The hardware configuration of the terminal station 2 is also the same as that in FIG. 10. The processor 91 reads a program from the storage unit 92 and executes the program, thereby implementing the transmission control unit 27. The communication interface 93 corresponds to the transmission unit 24 and the reception unit 25.

The hardware configuration of the base station 6 is also the same as that in FIG. 10. The processor 91 reads a program from the storage unit 92 and executes the program, thereby implementing the analysis unit 62. The communication interface 93 corresponds to the base station signal reception processing unit 42, the base station signal transmission processing unit 43, and the communication unit 45.

The hardware configuration of the base station 8 is also the same as that in FIG. 10. The processor 91 reads a program from the storage unit 92 and executes the program, thereby implementing the analysis unit 62. The communication interface 93 corresponds to the base station signal reception processing unit 42, the base station signal transmission processing unit 43, the communication unit 45, and the terminal signal reception processing unit 81.

The hardware configuration of the communication control apparatus is also the same as that in FIG. 10. The processor 91 reads a program from the storage unit 92 and executes the program, thereby implementing the analysis unit 62.

According to the embodiments described above, it is possible to reduce an amount of data when the relay apparatus relays received data while moving. Note that, in the embodiments described above, the case where the moving body equipped with the mobile relay station is an LEO satellite has been described, but it may be another flying object flying above, such as a geostationary satellite, a drone, or a HAPS.

According to the above-described embodiments, the wireless communication system includes a transmission apparatus and a communication apparatus that moves. For example, the transmission apparatus is the terminal station 2 of the embodiments, and the communication apparatus is the mobile relay stations 3, 5, and 7 of the embodiments. The transmission apparatus includes a wireless transmission unit and a transmission control unit. For example, the wireless transmission unit is the transmission unit of the embodiments, and the transmission control unit is the transmission control unit 27 of the embodiments. The wireless transmission unit transmits a radio signal to the communication apparatus. The transmission control unit determines a transmission condition of the radio signal, and performs control to transmit a first radio signal from the wireless transmission unit according to the determined transmission condition. The communication apparatus includes a reception unit. For example, the reception unit is the terminal communication units 32 and 71 of the embodiments. The reception unit receives the first radio signal transmitted from the transmission apparatus. The wireless communication system includes a statistics calculation unit, an information generation unit, and a notification unit. The statistics calculation unit is the statistics calculation units 371 and 621 of the embodiments, the information generation unit is the information generation units 373 and 623 of the embodiments, and the notification unit is the notification units 374, 624, and 54 of the embodiments. The statistics calculation unit acquires a transmission condition used for the first radio signal transmitted from the transmission apparatus in the area and normally received by the reception unit, and generates statistical information of the acquired transmission condition. The information generation unit extracts a transmission condition having a high probability that a radio signal is normally received on the basis of the statistical information, and generates transmission control information indicating the extracted transmission condition. The notification unit notifies the transmission apparatus in the area of the transmission control information generated by the information generation unit. The notification unit may notify a transmission apparatus with a higher priority among the transmission apparatuses in the area of the transmission control information. The transmission control unit determines a transmission condition of the radio signal on the basis of the transmission control information, and performs control to transmit a second radio signal from the wireless transmission unit according to the determined transmission condition.

The transmission condition may include one or more of a transmission time in the transmission apparatus, a direction of the communication apparatus with respect to the transmission apparatus, the number of transmissions of the same signal, a channel, the number of channels, and a transmission interval. In addition, the statistics calculation unit may calculate the direction of the communication apparatus with respect to the transmission apparatus on the basis of the position of the communication apparatus at the transmission time or the time when the reception unit has received the first radio signal and the position of the transmission apparatus.

The transmission control unit may set, in the first radio signal, information from which it is possible to acquire a transmission condition used for transmission of the first radio signal. The statistics calculation unit acquires the transmission condition from the first radio signal normally received by the reception unit.

The transmission control unit may set the information of the surrounding environment of the transmission apparatus in the first radio signal. The statistics calculation unit generates statistical information of the transmission condition used for the first radio signal normally received by the reception unit and the surrounding environment acquired from the first radio signal normally received by the reception unit. The transmission control unit determines the transmission condition of the radio signal on the basis of the transmission control information and the information of the surrounding environment of the transmission apparatus, and performs control to transmit the second radio signal from the wireless transmission unit according to the determined transmission condition. The surrounding environment information includes one or both of weather information and noise floor information.

The transmission control unit may set the position information indicating the position of the own apparatus in the first radio signal. The statistics calculation unit specifies an area on the basis of the position information set in the first radio signal.

The communication apparatus may include the statistics calculation unit, the information generation unit, and the notification unit.

The communication apparatus may further include a transmission unit. The transmission unit transmits data received by the reception unit from the transmission apparatus using the radio signal to the reception apparatus. In this case, the reception apparatus may include the statistics calculation unit and the information generation unit.

The wireless communication system may further include a control apparatus. The control apparatus includes the statistics calculation unit, the information generation unit, and the notification unit.

As described above, the embodiments of the present invention have been described in detail with reference to the drawings; however, a specific configuration is not limited to the embodiments and includes design and the like within the scope not departing from the gist of the present invention.

REFERENCE SIGNS LIST

1, 11, 12 Wireless communication system
2 Terminal station
3, 5, 7 Mobile relay station
4, 6, 8 Base station
21 Antenna
22 Position detection unit
23 Data storage unit
24 Transmission unit
25 Reception unit
26 Control information storage unit
27 Transmission control unit
28 Communication unit
31, 36 Antenna
32 Terminal communication unit
33 Data storage unit
34 Data transmission control unit
35 Base station communication unit
37 Analysis unit
41 Antenna station
42 Base station signal reception processing unit
43 Base station signal transmission processing unit
44 Notification unit
45 Communication unit
51 Data storage unit
52 Data transmission control unit
53 Notification information storage unit
54 Notification unit
61 Data storage unit
62 Analysis unit
71 Terminal communication unit
72 Data storage unit
73 Data transmission control unit
81 Terminal signal reception processing unit
91 Processor
92 Storage unit
93 Communication interface
94 User interface
321 Terminal signal reception unit
322 Terminal signal demodulation unit
323 Terminal signal modulation unit
324 Terminal signal transmission unit
371 Statistics calculation unit
372 Storage unit

373 Information generation unit
374 Notification unit
621 Statistics calculation unit
622 Storage unit
623 Information generation unit
624 Notification unit
711 Reception unit
712 Reception waveform recording unit
811 Reception processing unit
812 Demodulation unit

The invention claimed is:

1. A wireless communication system comprising one or more transmission apparatuses and a communication apparatus that moves, wherein the one or more transmission apparatuses each includes a wireless transmitter that transmits a radio signal to the communication apparatus, and a transmission controller that determines a first transmission condition of a radio signal and performs control to transmit a first radio signal from the wireless transmitter according to the determined first transmission condition, and the communication apparatus includes a receiver that receives the first radio signal transmitted from each of the transmission apparatuses, the wireless communication system comprising:

a statistics calculator that acquires the first transmission condition used for the first radio signal transmitted from each of the transmission apparatuses in an area, and generates statistical information of the acquired first transmission condition;

an information generator that extracts a second transmission condition having improved transmission success rate on a basis of the statistical information and generates transmission control information indicating the extracted second transmission condition; and a sender that notifies at least one of the transmission apparatuses in the area of the transmission control information generated by the information generator, wherein the transmission controller determines a third transmission condition of a radio signal on a basis of the transmission control information, and performs control to transmit a second radio signal from the wireless transmitter according to the determined third transmission condition.

2. The wireless communication system according to claim 1, wherein the first transmission condition and the third transmission condition determined by the transmission controller of each of the transmission apparatuses include one or more of a transmission time in the each of the transmission apparatuses, a direction of the communication apparatus with respect to the each of the transmission apparatuses, a number of transmissions of a same signal, a channel, a number of channels, and a transmission interval.

3. The wireless communication system according to claim 2, wherein the statistics calculator calculates the direction of the communication apparatus with respect to each of the transmission apparatuses on a basis of a position of the communication apparatus at the transmission time or a time when the receiver has received the first radio signal and a position of the each of the transmission apparatuses.

4. The wireless communication system according to claim 1, wherein the transmission controller sets, in the first radio signal, information from which it is possible to acquire the first transmission condition used for transmission of the first radio signal, and the statistics calculator acquires the first transmission condition from the first radio signal.

5. The wireless communication system according to claim 1, wherein the transmission controller of each of the transmission apparatuses sets information of a surrounding environment of the each of the transmission apparatuses in the first radio signal, the statistics calculator generates statistical information of the first transmission condition used for the first radio signal and the information of the surrounding environment acquired from the first radio signal, and the transmission controller of each of the transmission apparatuses determines the third transmission condition on a basis of the transmission control information and the information of the surrounding environment of the each of the transmission apparatuses, and performs control to transmit a second radio signal from the wireless transmitter according to the determined third transmission condition.

6. The wireless communication system according to claim 5, wherein information of the surrounding environment includes one or both of weather information and noise floor information.

7. The wireless communication system according to claim 1, wherein the transmission controller of each of the transmission apparatuses sets position information indicating a position of the each of the transmission apparatuses to the first radio signal, and the statistics calculator specifies the area including each of the transmission apparatuses on a basis of the position information set in the first radio signal by the transmission controller of the each of the transmission apparatuses.

8. The wireless communication system according to claim 1, wherein the communication apparatus includes the statistics calculator, the information generator, and the notification unit.

9. The wireless communication system according to claim 1, wherein the one or more transmission apparatuses are installed on earth, and the communication apparatus is included in a low earth orbit satellite.

10. The wireless communication system according to claim 1, wherein the communication apparatus further includes a transmitter that transmits data received by the receiver from each of the transmission apparatuses using a radio signal to a reception apparatus, and the reception apparatus includes the statistics calculator and the information generator.

11. The wireless communication system according to claim 10, wherein the one or more transmission apparatuses and the reception apparatus are installed on earth, and the communication apparatus is included in a low earth orbit satellite.

12. The wireless communication system according to claim 1, wherein the sender notifies at least one of the transmission apparatuses with a higher priority in the area of the transmission control information.

13. A communication apparatus comprising:

a receiver that receives a radio signal;

a statistics calculator that acquires a first transmission condition used for transmission of the radio signal transmitted from each of transmission apparatuses in an area, and generates statistical information of the acquired first transmission condition;

an information generator that extracts a second transmission condition having improved tranmission success rate on a basis of the statistical information and generates transmission control information indicating the extracted second transmission condition; and a sender that notifies at least one of the one or more transmission apparatuses in the area of the transmission control information generated by the information generator.

14. A communication control apparatus comprising:

a statistics calculator that acquires a first transmission condition used for transmission of a radio signal transmitted from each of transmission apparatuses in an area, and generates statistical information of the acquired first transmission condition;

an information generator that extracts a second transmission condition having improved tranmission success rate on a basis of the statistical information and generates transmission control information indicating the extracted second transmission condition; and a sender that notifies at least one of the transmission apparatuses in the area of the transmission control information generated by the information generator.

* * * * *